(12) United States Patent
Guo

(10) Patent No.: US 7,975,796 B2
(45) Date of Patent: Jul. 12, 2011

(54) REDUCED FRICTION DIFFERENTIAL DISCONNECT FOR A MOTOR VEHICLE

(75) Inventor: Dongfeng Guo, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 574 days.

(21) Appl. No.: 12/164,929

(22) Filed: Jun. 30, 2008

(65) Prior Publication Data

US 2009/0321170 A1   Dec. 31, 2009

(51) Int. Cl.
*B60K 23/08* (2006.01)
(52) U.S. Cl. ............... 180/247; 192/69.9
(58) Field of Classification Search .......... None
See application file for complete search history.

(56) References Cited

U.S. PATENT DOCUMENTS

| 2,795,964 | A | * | 6/1957 | Short ........................ 74/339 |
| 3,872,955 | A | * | 3/1975 | McIntyre ................ 192/69.9 |
| 5,996,720 | A | * | 12/1999 | Hunt ........................ 180/247 |
| 6,517,462 | B2 | | 2/2003 | Borgan et al. |
| 6,659,249 | B2 | | 12/2003 | Borgen et al. |
| 7,096,990 | B2 | | 8/2006 | Borgen et al. |
| 7,121,395 | B2 | * | 10/2006 | Ore et al. ............... 192/69.9 |

* cited by examiner

*Primary Examiner* — Tony H. Winner
(74) *Attorney, Agent, or Firm* — Ralph E. Smith

(57) ABSTRACT

An axle disconnect system for selectively connecting or disconnecting a wheel-side shaft and a differential-side shaft having a common axis of rotation in a drivetrain of a motor vehicle. In the axle disconnect an output gear is splined to the wheel-side shaft on an outside diameter of the wheel-side shaft, and a translatable collar is splined to the output gear on an outside diameter of the output gear. The collar is arranged to be translated along the common axis of rotation for splined connection with the differential-side shaft while retaining the splined connection with the output gear.

14 Claims, 4 Drawing Sheets

REDUCED FRICTION DIFFERENTIAL DISCONNECT FOR A MOTOR VEHICLE

FIELD OF THE INVENTION

The present invention relates to a drivetrain in a motor vehicle of the type having four-wheel or all-wheel drive capability, and, more particularly, to a system for disconnecting a drive wheel from a secondary driveline differential to avoid back-driving of the differential.

BACKGROUND OF THE INVENTION

Four-wheel and all-wheel drive vehicles are popular for their enhanced capabilities in inclement weather and off-highway conditions as compared with two-wheel drive vehicles. Such vehicles necessarily have a more complex drivetrain which, in addition to the primary driveline, employ a secondary driveline, e.g. with additional components, such as a secondary axle and a propshaft, and frequently also a transfer case.

Secondary driveline components introduce additional mass, inertia and friction to the drivetrain, which in turn translates to increased fuel consumption. Although enhanced tractive capabilities are not needed for a vehicle traveling a paved highway in dry weather, all four-wheel and all-wheel drive vehicles permanently carry the additional driveline hardware. In some drivetrain designs secondary driveline components may be arranged whereby they can be selectively disconnected from the primary driveline. The secondary axle road wheels, however, will still be "back-driving" the secondary axle differential through axle-shafts which connect the wheels and the differential. Such back-driving can create parasitic drag that, notwithstanding the secondary driveline disconnect, may nevertheless reduces a vehicle's fuel efficiency.

In an effort to reduce the parasitic drag caused by back-driven secondary driveline components, arrangements for selectively disconnecting a secondary differential from at least one of its respective axle-shafts have been developed. Many of these arrangements further disconnect a secondary axle-shaft from its differential via a dog clutch, i.e. by selectively removing a mechanical interference between an axle-shaft and the differential. Typically a dog clutch is positioned on a secondary axle-shaft such that the dog clutch effectively splits the secondary axle-shaft into a differential-side shaft component and a wheel-side shaft component. Thus positioned, a dog clutch may be actuated to selectively connect or disconnect the two secondary axle-shaft components. FIG. 4 illustrates an example of a prior art differential disconnect utilizing a dog clutch 200 for selectively connecting the two shaft components. As shown, dog clutch 200 couples differential-side shaft component 210A with wheel-side shaft component 210B via an internally splined, axially translatable sleeve 220.

Drive wheels typically generate substantial axial, or thrust loads during a vehicle's operation. In a differential disconnect as described above, it is wheel-side shaft 210B that is primarily subjected to those thrust loads. As a consequence, the wheel-side shaft must be supported on the vehicle with at least one bearing capable of sustaining such thrust loads, such as a thrust bearing 230 shown in FIG. 4. Generally, however, bearings capable of supporting high thrust loads create considerable frictional drag when employed in mounting a rotating shaft. Frictional drag on a wheel-side shaft, even when the shaft is disconnected from its differential, increases parasitic drag on the vehicle driveline and thus increases vehicle fuel consumption.

SUMMARY OF THE INVENTION

The present invention is a differential disconnect system for a drivetrain of a motor vehicle of the type having either four-wheel or all-wheel drive capability. The differential disconnect system is for selectively connecting or disconnecting a wheel-side shaft and a differential-side shaft having a common axis of rotation. The differential disconnect system includes an output gear splined to the wheel-side shaft on an outside diameter of the wheel-side shaft. The system additionally includes a translatable collar splined to the output gear on an outside diameter of the output gear. The collar is arranged to be translated along the common axis of rotation for splined connection with the differential-side shaft on an outside diameter of the differential-side shaft while retaining the splined connection with the output gear. The wheel-side shaft and the differential-side shaft become connected for transmitting torque when the collar is thus translated.

The vehicle differential disconnect system may also include an electric motor mounted on the vehicle for translating the collar. Actuation of the electric motor may be accomplished via a vehicle mounted controller.

The wheel-side shaft may be fixed to a wheel hub and the wheel hub may be rotatably supported by a needle bearing at an interface of the wheel hub and the housing. The output gear may be rotatably supported by a ball bearing at an interface of the output gear and the housing. Additionally, the differential-side shaft may be rotatably supported by a needle bearing positioned at an interface of the output gear and the differential-side shaft.

It should be understood that the detailed description and specific examples which follow, while indicating preferred embodiments of the invention, are intended for purposes of illustration only and are not intended to limit the scope of the invention.

DETAILED DESCRIPTION OF THE INVENTION

In general the present invention is directed to a drivetrain in a motor vehicle of the type having either four-wheel or all-wheel drive capability, and, more particularly, to a system for selectively engaging or disengaging a differential in such a vehicle drivetrain. Therefore, the term "disconnect", as employed in the designation of the subject system, is used herein to describe both an engagement and a disengagement function performed in the vehicle drivetrain.

Figure 1:
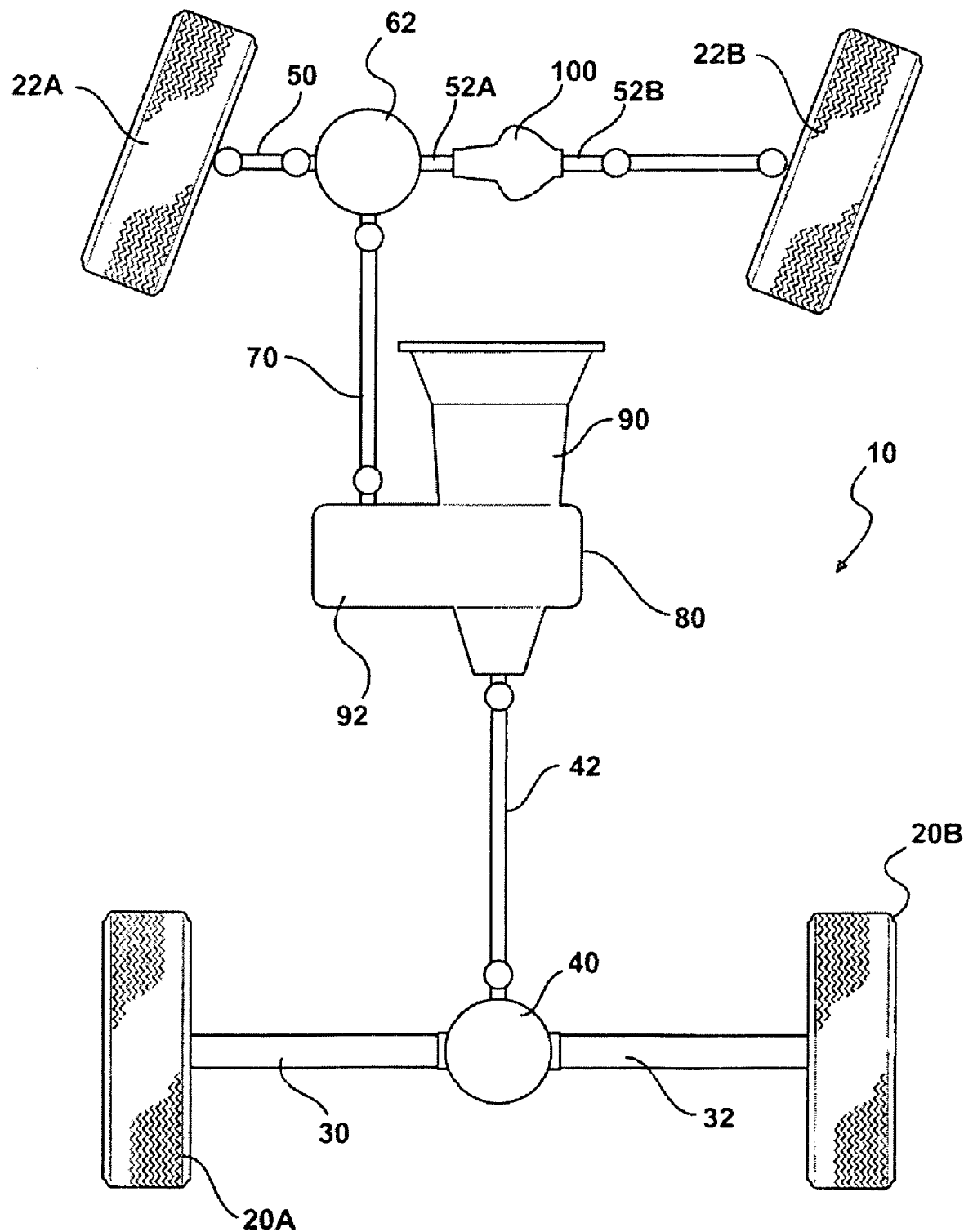
FIG. 1 is a schematic diagram of a typical motor vehicle drivetrain having primary and secondary drivelines.

Referring now to the drawings in which like elements of the invention are identified with identical reference numerals throughout, FIG. 1 is a schematic diagram of a four-wheel or all-wheel drive drivetrain 10 of a motor vehicle having a primary driveline and a secondary driveline. The primary driveline includes drive wheels 20A and 20B connected to primary differential 40 via axle-shafts 30 and 32, respectively. Primary differential 40 is connected to transmission 80 via prop-shaft 42. The secondary driveline includes drive wheels 22A and 22B connected for torque transmission to secondary differential 62 via axle-shafts 50 and 52, respectively. Axle half-shaft 52 includes dog-clutch 100 to interrupt torque transmission from drive wheel 22B to differential 62, i.e. to eliminate back-driving of the differential, when the secondary driveline is disconnected from the primary driveline. Prop-shaft 70 connects differential 62 to transfer case 80. Transfer case 80 may be mounted to transmission 90 whereby it can function to selectively connect the secondary driveline to the primary driveline via engagement of clutch assembly 92.

Figure 2:
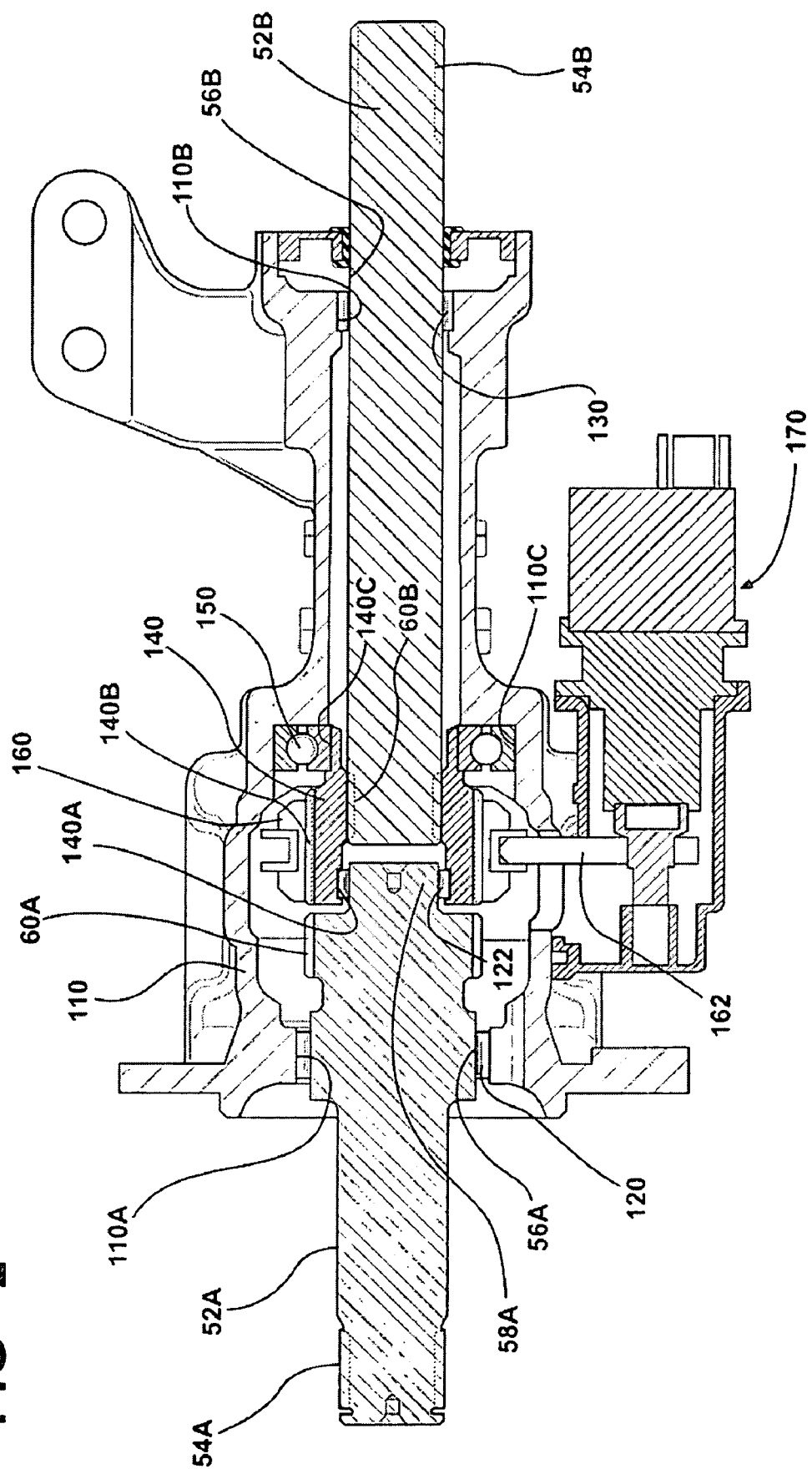
FIG. 2 is a cross-sectional side view of a drive axle disconnect according to the invention.
Figure 3:
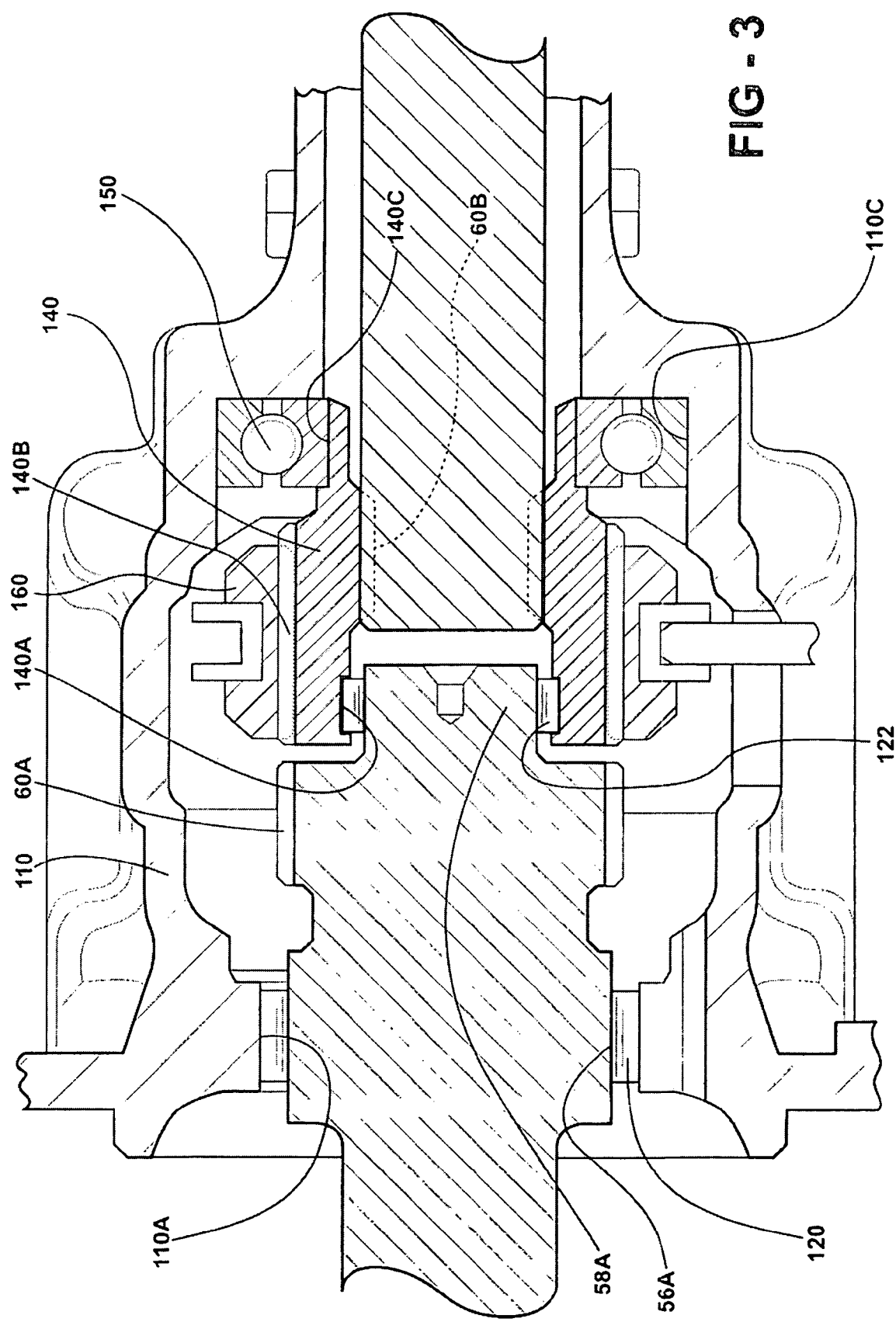
FIG. 3 is a close up view of circled area A shown in FIG. 2.
Figure 4:
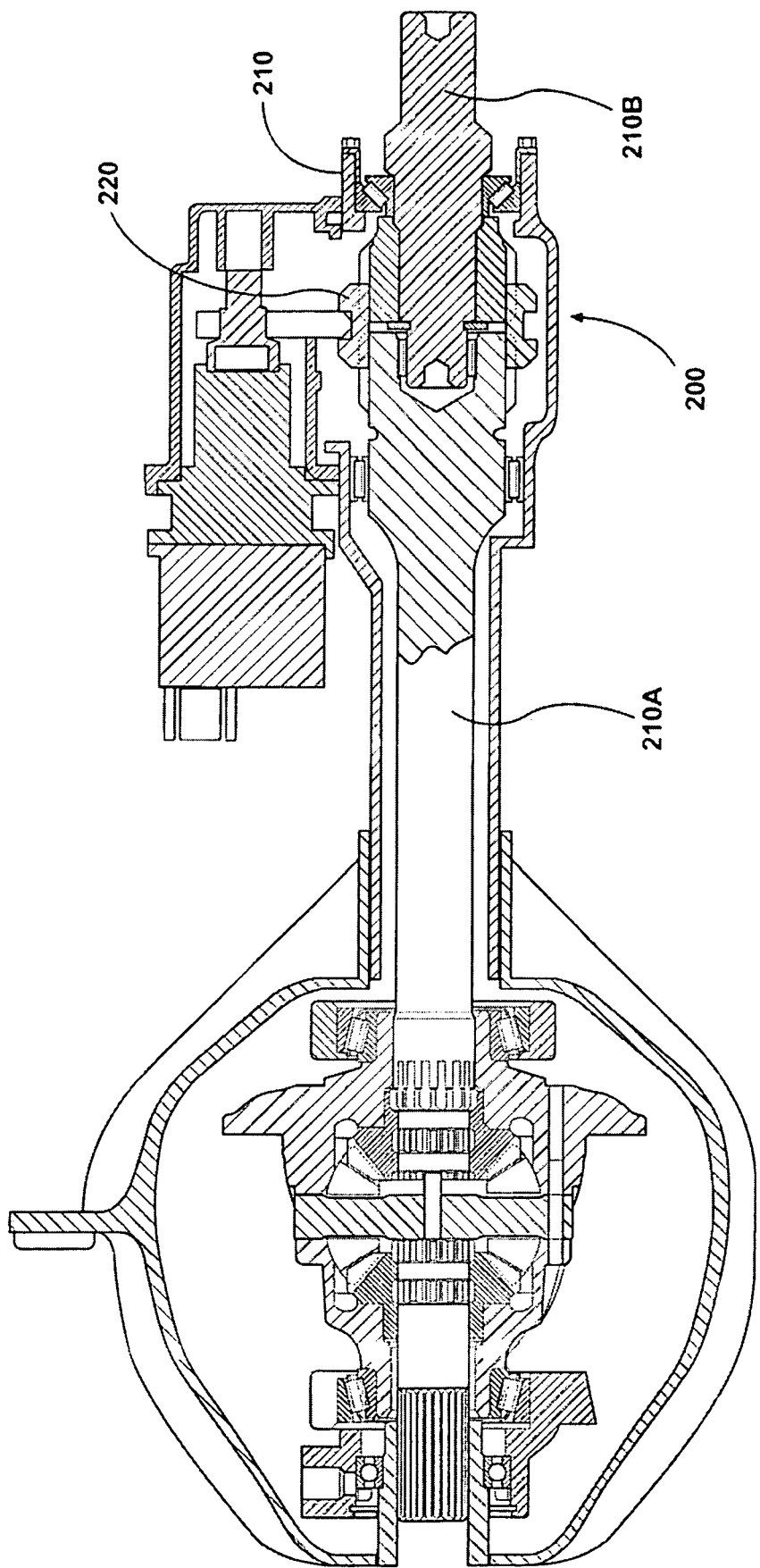
FIG. 4 is a cross-sectional side view of a drive axle disconnect according to the prior art.

FIGS. 2 and 3 illustrate a clutch arrangement 100 according to the present invention. Clutch 100 mechanically divides axle-shaft 52 into half-shaft 52A and half-shaft 52B. Half-shaft 52A is engaged at spline 54A with differential 62, and half-shaft 52B is engaged at spline 54B with a bearing hub (not shown) of drive wheel 22B. Clutch 100 includes housing 110 for retaining and supporting dog-clutch internal components. Half-shaft 52A and half-shaft 52B are inserted into housing 110 through radial apertures 110A and 110B, respectively. Half-shaft 52A is supported on journal 56A in aperture 110A by bearing 120, which can be a needle-roller type, but may be any other type of bearing capable of providing radial support to a rotating shaft. Half-shaft 52A is additionally supported on journal 58A in aperture 140A of output gear 140 by bearing 122, which also can be a needle-roller type, but may be any other type of bearing for radially supporting the shaft.

Half-shaft 52B is supported on journal 56B in aperture 110B by bearing 130, which can be a needle-roller type, but may be any other type for radially supporting the shaft. Male spline of half-shaft 52B is engaged with female spline 60B of output gear 140. Output gear 140 and half-shaft 52A include male splines 140B and 60A, respectively. Output gear 140 is supported on journal 140C in aperture 110C by ball bearing 150, as shown in FIG. 3. Ball bearing 150 is used to support output gear 140 thus taking advantage of a ball bearing's ability to simultaneously provide both radial and axial support to a rotating component. Unlike needle-roller bearings, ball bearings are typically capable of withstanding some degree of axial or thrust load.

Male spline 140B of output gear 140 and male spline 60A of half-shaft 52A have a matching profile. These splines are sized for engagement with a female spline of translatable collar 160. Collar 160 is arranged for translation along axis X, i.e. along the length of axle-shaft 52, to selectively engage or disengage half-shaft 52A and half-shaft 52B. Clutch 100 is disengaged when the inner diameter spline of collar 160 solely engages spline 140B. Clutch 100 is engaged when collar 160 has been translated along axis X, so that the female spline of collar 160 simultaneously engages spline 140B and spline 60A.

An electric motor 170, such as a direct current (DC) motor, may be mounted on housing 110 and coupled to collar 160 to controllably effect movement of the collar to selectively engage or disengage clutch 100. In an exemplary arrangement, electric motor 170 is coupled to collar 160 via shift fork 162. Electric motor 170 may be actuated by an operator controlled switch located inside the passenger compartment of the vehicle, e.g. on the instrument panel (not shown), or automatically via a vehicle mounted controller.

In contrast with known arrangements, the present invention permits half-shaft 52B to slide axially relative to output gear 140, and thus precludes drive wheel generated thrust loads from reaching the output gear. Hence, primary axial loads imparted on the output gear of the present invention will mainly be due to sliding friction generated at the splined interface between output gear 140 and half-shaft 52B. Typically, however, axial loads due to sliding friction are minimal compared to thrust loads generated by a vehicle's drive wheel. Additionally, axial loads generated by sliding friction are generally within the thrust load capability of common, commercially available ball bearings. Hence, according to the invention, the use of ball bearing 150 and bearing 130 to support output gear 140 and shaft 52B, respectively, permits driveline friction to be reduced and vehicle fuel efficiency to be improved.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle axle disconnect system for selectively connecting or disconnecting a wheel-side shaft and a differential-side shaft having a common axis of rotation, the axle disconnect comprising:
    an output gear splined to the wheel-side shaft on an outside diameter of the wheel-side shaft; and
    a translatable collar splined to the output gear on an outside diameter of the output gear and arranged to be translated along the common axis of rotation for splined connection with the differential-side shaft on an outside diameter of the differential-side shaft while retaining the splined connection with the output gear, so that the wheel-side shaft and the differential-side shaft are connected.

2. A vehicle axle disconnect system of claim 1, further comprising a housing for containing the axle disconnect and mounting the axle disconnect on a vehicle.

3. A vehicle axle disconnect system of claim 2, further comprising an electric motor mounted on the housing for translating the collar.

4. A vehicle axle disconnect system of claim 3, wherein the electric motor is actuated by a vehicle mounted controller.

5. A vehicle axle disconnect system of claim 1, wherein the wheel-side shaft is fixed to a wheel hub and the wheel hub is rotatably supported by a needle bearing at an interface of the wheel hub and the housing.

6. A vehicle axle disconnect system of claim 1, wherein the output gear is rotatably supported by a ball bearing at an interface of the output gear and the housing.

7. A vehicle axle disconnect system of claim 1, wherein the differential-side shaft is rotatably supported by a needle bearing positioned at an interface of the output gear and the differential-side shaft.

8. A vehicle drivetrain comprising an axle disconnect system for selectively connecting or disconnecting a drive wheel from a secondary differential, wherein the drivetrain comprises:
    a primary driveline having a primary axle arranged to drive the vehicle; and
    a secondary driveline having a secondary axle, a differential and two axle half-shafts arranged for selective mechanical engagement with the primary axle;
    wherein the axle disconnect system comprises:
    a wheel-side shaft connected to the drive wheel and a differential-side shaft connected to the differential, wherein the wheel-side shaft and the differential-side shaft have a common axis of rotation;
    an output gear splined to the wheel-side shaft on an outside diameter of the wheel-side shaft; and a translatable collar splined to the output gear on an outside diameter of the output gear and arranged to be translated along the common axis of rotation for splined connection with the differential-side shaft on an outside diameter of the differential-side shaft while retaining the splined connection with the output gear, so that the drive wheel and the differential are connected.

9. A vehicle drivetrain of claim 8, wherein the axle disconnect system further comprises a housing for containing the axle disconnect and mounting the axle disconnect on a vehicle.

10. A vehicle drivetrain of claim 9, wherein the axle disconnect system further comprises an electric motor mounted on the housing for translating the collar.

11. A vehicle drivetrain of claim 10, wherein the electric motor is actuated by a vehicle mounted controller.

12. A vehicle drivetrain of claim 8, wherein the wheel-side shaft is fixed to a wheel hub and the wheel hub is rotatably supported by a needle bearing at an interface of the wheel hub and the housing.

13. A vehicle drivetrain of claim 8, wherein the output gear is rotatably supported by a ball bearing at an interface of the output gear and the housing.

14. A vehicle drivetrain of claim 8, wherein the differential-side shaft is rotatably supported by a needle bearing positioned at an interface of the output gear and the differential-side shaft.

* * * * *